INVENTORS
RONALD M. PAITICH
JOHN F. MORAN
BY
ATTORNEY

United States Patent Office 3,500,178
Patented Mar. 10, 1970

3,500,178
FIELD SCANNED GYROMAGNETIC RESONANCE SPECTROMETER EMPLOYING FIELD TRACKED DOUBLE RESONANCE
Ronald M. Paitich, Los Altos, and John F. Moran, Palo Alto, Calif., assignors to Varian Associates, Palto Alto, Calif., a corporation of California
Filed June 12, 1967, Ser. No. 645,391
Int. Cl. G01r 33/08
U.S. Cl. 324—.5      5 Claims

ABSTRACT OF THE DISCLOSURE

A gyromagnetic resonance spectrometer is disclosed which employs magnetic field scan and a field tracked frequency second resonance excitation. The spectrometer employs a fixed frequency radio frequency transmitter for irradiating the sample under analysis with a radio frequency carrier magnetic field. A fixed audio frequency field modulator modulates the polarizing magnetic field to excite resonance of the sample at a first fixed frequency sideband of the carrier frequency. A magnetic field scan causes resonance of the sample to be scanned through the fixed frequency of the first sideband for producing the output spectrum of the sample.

Double resonance experiments are performed by exciting resonance of a second chemically shifted group within the sample by a second sideband of the carrier frequency. Resonance of the second group is continuously excited by modulating the polarizing field with a variable audio frequency which is scanned in concert with the field scan to sustain resonance of the second group. The scanned variable audio frequency is obtained from a voltage tuned oscillator. A signal derived from the field scan is compared with the output of a frequency to voltage converter measuring the output of the voltage tuned oscillator. The error signal obtained from the comparison is used to correct the frequency of the voltage tuned oscillator to obtain a precise track of the field scan.

DESCRIPTION OF THE PRIOR ART

Heretofore, magnetic field scanned nuclear resonance spectrometers have employed double resonance for spin decoupling and for other double resonance experiments. In one such system the sample was irradiated with a carrier radio frequency magnetic field at $f_0$ and the polarizing magnetic field was modulated at two fixed audio frequencies. One audio modulator at $f_1$ produced a sideband of the rf carrier frequency $(f_0+f_1)$ for observing resonance of the sample. The other audio modulator produced a second sideband at $(f_0+f_2)$ for exciting resonance of a spin coupled group to be irradiated. The frequency of the second audio modulator was set at a frequency to produce saturated resonance of the second group to be decoupled when the first sideband was at the correct frequency to excite the group to be analyzed. The spectrum was scanned by scanning the polarizing field intensity.

The problem with this prior arrangeemnt is that the difference between the two audio frequencies $(f_1-f_2)$ must be precisely determined in advance for optimum spin decoupling and since this frequency difference remains fixed during the scan only two groups can be decoupled for each scan of the spectrum. If the group to be decoupled is coupled to more than one line group of the spectrum, additional scans are required with different selections of the difference between the two audio frequencies $(f_1-f_2)$.

SUMMARY OF THE PRESENT INVENTION

The principal object of the present invention is the provision of an improved gyromagnetic resonance spectrometer.

One feature of the present invention is the provision in a magnetic field scanned double resonance gyromagnetic resonance spectrometer, of means for scanning the resonance excitation frequency of a certain group in concert with the field scan to sustain resonance of the certain resonance group to be irradiated during a field scan of the spectrum of the sample under analysis, whereby the affect of resonance of the certain group on the resonance of all the other groups of the sample under analysis is observed.

Another feature of the present invention is the same as the preceding feature wherein the means for scanning the frequency of the certain resonance excitation includes a voltage tunable oscillator having its output frequency scanned by a control signal derived from the magnetic field scan, whereby the frequency of the resonance excitation of the certain group tracks the field scan.

Another feature of the present invention is the same as any one or more of the preceding features including the provision of means for sensing the frequency of the certain resonance excitation and deriving a signal for comparison with a signal derived from the field scan to obtain an error signal employed to correct the frequency of the resonance excitation applied to the certain group whereby the frequency of the resonance excitation applied to the certain group is caused to precisely track the field scan.

Other features and advantages of the present invention will become apparent upon a perusal of the following specification taken in connection with the accompanying drawings wherein:

DESCRIPTION OF THE PREFERRED EMBODIMENTS

Figure 1:
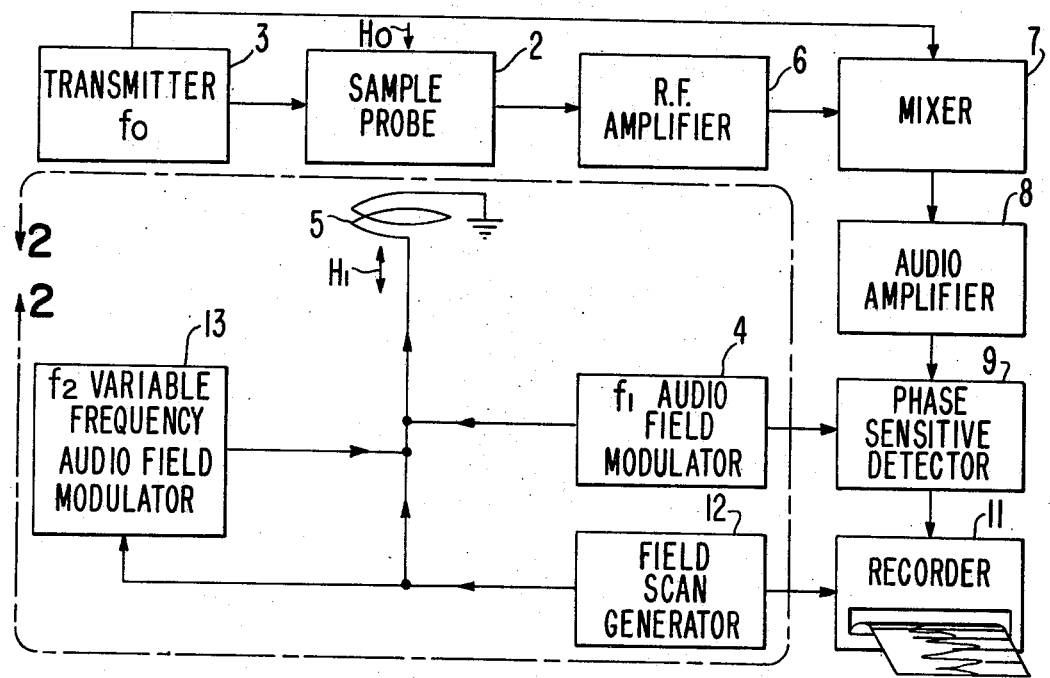
FIG. 1 is a schematic block diagram of a spectrometer employing features of the present invention.

Referring now to FIG. 1, there is shown a nuclear resonance spectrometer incorporating features of the present invention. The spectrometer 1 includes a sample probe 2 for immersing a sample to be investigated such as, for example, (3-bromopropyl)-benzene in a unidirectional polarizing magnetic field $H_0$ as of, for example, 14.1 kg. intensity. A fixed frequency radio transmitter 3, operating at a carrier frequency $f_0$ near the nuclear resonant frequency of the nuclei under analysis, such as, for example, 60 mHz for protons, supplies the carrier signal to the probe 2 for irradiating the sample with a radio frequency magnetic field at the carrier frequency $f_0$.

A fixed frequency audio frequency field modulator 4 supplies a signal at $f_1$ to a coil 5 to produce a magnetic field $H_1$ for modulating the polarizing magnetic field $H_0$ at the audio frequency $f_1$. As used herein, "audio frequency" is defined to include the audio frequency range and also frequencies above the audible range up to 2 mHz. In a typical example, $f_1$ is 5 kHz. The audio frequency $f_1$ and the carrier frequency combine in the sample to produce resonance of the nuclei, if any, at a first sideband of the carrier frequency $(f_0+f_1)$.

Resonance signals emanating from the nuclei at $(f_0+f_1)$ are picked up in the probe 2 and fed to an RF amplifier 6 wherein they are amplified and fed to one input terminal of a mixer 7. A sample of the carrier signal $f_0$ is fed to the other input of the mixer 7. The output of the mixer 7 is an audio frequency resonance signal at $f_1$ which is fed to an audio amplifier 8 and thence to one input terminal of a phase sensitive detector 9. A sample of the audio field modulation frequency at $f_1$ is fed to the other input of the phase sensitive detector 9.

Figure 3A:
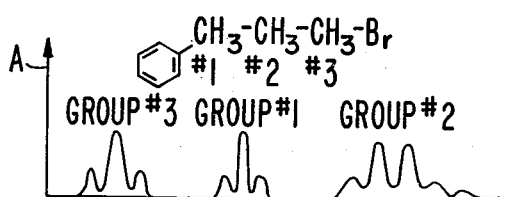
FIGS. 3a and 3b are resonance spectra for certain proton groups of (3-bromopropyl)-benzene, also written as, 1-bromo-3-phenylpropane without and with spin decoupling respectively.

The output of the phase sensitive detector 9 is a DC resonance signal which is fed to a recorder 11 and recorded versus a field scan signal derived from a field scan generator 12 to produce a spectrum of the sample under analysis, as shown in FIG. 3a. The field scan generator 12 scans the polarizing magnetic field intensity $H_0$ through resonance of the various groups of nuclei within the sample by passing a DC scan current through coil 5.

As seen from the spectrum of FIG. 3a, the second group of $CH_3$ protons is split into five lines indicating substantial spin coupling to the other $CH_3$ groups. It is often desirable to saturate the resonance of one group to spin decouple that group from other groups to collapse the line splittings and, thus, ascertain the relative positions of the groups in the molecules.

Accordingly, a second audio frequency field modulator 13 is provided for modulating the polarizing magnetic field $H_0$ at a second audio frequency to produce a second sideband $(f_0+f_2)$ of the carrier in the sample at the resonance frequency of the group of nuclei to be spin decoupled. It is desirable that this group be continuously excited into saturated resonance during the field scan of the sample under analysis to decouple that particular group of nuclei from all the other groups in the sample for the duration of the scan.

Figure 3B:
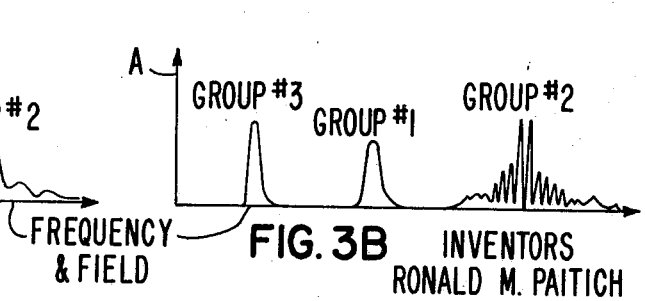

Therefore, a sample of the field scan signal is fed to the variable frequency audio modulator 13 to cause the frequency $f_2$ to track the field scan such that saturated resonance of the group to be decoupled is sustained during the field scan of the sample under investigation. The result is a spin decoupled resonance spectrum as shown in FIG. 3b. The resonance lines for the first and third groups of nuclei are collapsed into single lines. The spectrum signal for the second group shows the zero-beat effects obtained when the observing frequency is coincident with the spin decoupling frequency.

Figure 2:
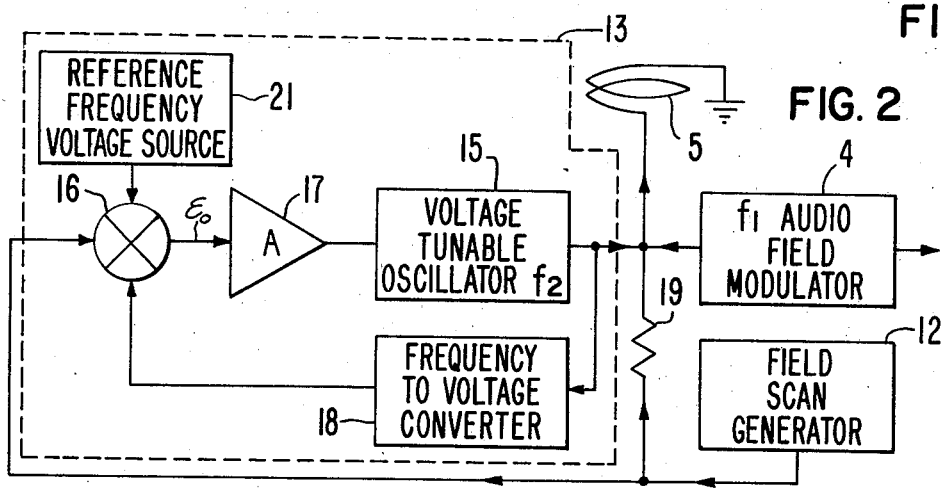
FIG. 2 is a schematic block diagram of a portion of the circuit of FIG. 1 delineated by line 2—2 and showing more of the detail of certain of the components.

Referring now to FIG. 2, the field tracked variable frequency audio field modulator circuit 13 is shown in greater detail. The modulator 13 includes a voltage tunable oscillator 15 producing the output audio frequency at $f_2$ which is variable in frequency according to an error voltage $E_0$ as derived from the output of an error detector 16 via amplifier 17. In the error detector 16, a sample voltage derived from the field scan current is compared with a feedback voltage derived from the output of a frequency to voltage converter 18 which measures the output frequency $f_2$ and converts it into a voltage. The sample scan voltage is derived across resistor 19 connected in series with the field scan coil 5. Alternatively, a clip-on current meter such as, for example, a Hewlett Packard Model 428-B could be employed to derive the sample scan signal. The output of the error detector 16 is the error voltage $E_0$ which corrects the frequency of the oscillator 15 to precisely track the field scan. A suitable frequency to voltage converter 18 is a Hewlett Packard Model 5210 A/B frequency meter. A reference frequency voltage source 21 also feeds a voltage into the error detector 16 for comparison with the feedback voltage for producing offsets in the frequency $f_2$ of the field modulator 13. Such offsets are useful for setting the starting frequency of the frequency scan of $f_2$.

In operation, the field modulator 13 at frequency $f_2$ tracks the field scan to $\pm 1/4$ of a cycle over a range of 1500 Hz., thus, corresponding to a tracking accuracy of one part in 6000.

In the specific spectrometer embodiment of FIG. 1, a certain group of nuclei to be decoupled from the other groups of the sample is irradiated with a relatively strong radio frequency excitation to produce saturated resonance of the certain group of nuclei. In other double resonance experiments, the resonance excitation of the certain group would be much weaker and need not produce saturated resonance of the certain group. The spectrum of the sample would be scanned, as before, while sustaining resonance of the certain group to observe the affects of resonance of the certain group on the resonance of the other groups of the sample.

Also, it is not necessary that the resonance of the certain group be obtained by combining the carrier RF magnetic field with the second field modulation signal at $f_2$ in the sample to produce resonance excitation for the second group at the sideband of the carrier, namely, $f_0+f_2$. Resonance of the certain group to be sustained during scan of the sample may be obtained from a second radio frequency transmitter having a frequency $f_3$ equal to $(f_0+f_2)$ for directly applying a radio frequency magnetic field to the sample at $(f_0+f_2)$. The frequency $f_3$ of the second radio frequency transmitter would be scanned instead of scanning the second field modulation frequency $f_2$ to sustain resonance of the certain second group of nuclei as the spectrum of the sample was scanned. The second radio frequency transmitter frequency $f_3$ would be scanned in the same manner as described with regard to FIG. 2 except that the voltage tunable oscillator 15 at $f_2$ would be replaced by the radio frequency transmitter operating at $f_3$ and the output at $f_3$ would be applied to the same input terminal of the probe 2 as the first radio frequency signal at $f_0$.

Since many changes could be made in the above construction and many apparently widely different embodiments of this invention could be made without departing from the scope thereof, it is intended that all matter contained in the above description or shown in the accompanying drawings will be interpreted as illustrative and not in a limiting sense.

What is claimed is:

1. In a gyromagnetic resonance spectrometer, means for exciting and detecting gyromagnetic resonance of a sample of matter under analysis in a unidirectional polarizing magnetic field at a first fixed radio frequency, means for scanning the intensity of the polarizing magnetic field to produce a scan through the resonance spectrum of at least a first group of gyromagnetic bodies in the sample, means for exciting gyromagnetic resonance of a certain second group of gyromagnetic bodies in the sample at a second radio frequency to permit decoupling the spins of said first and second groups. The improvement comprising, means for scanning the frequency of the excitation of the second group in proportion to the scan of the polarizing magnetic field to sustain resonance of the second group during the scan through the resonance spectrum of the first group of gyromagnetic bodies.

2. The apparatus of claim 1 wherein said means for scanning the frequency of the resonance excitation of the second group includes a variable frequency oscillator, means for deriving a control output from said field scanning means which is proportional to the field scan, and means for feeding the control output to said variable frequency oscillator to cause the frequency of said oscillator to track the scan of the magnetic field.

3. The apparatus of claim 2 wherein said variable frequency oscillator in a voltage turnable oscillator, said means for scanning the magnetic field includes a coil through which a scan current is fed to produce the scanned field, and wherein said means for deriving the control output includes a resistor in series with said field scanning coil such that the scan current produces a voltage drop across said resistor to derive a control voltage output.

4. The apparatus of claim 2 including means for sensing the output frequency of said variable frequency oscillator and for deriving a DC signal having an amplitude proportional to the sensed output frequency, and means for comparing the DC signal with the control signal derived from the field scan to obtain an error signal for correcting the frequency of said variable frequency oscillator, whereby the frequency of the resonance excitation of the second group is made to precisely track the magnetic field scan.

5. The apparatus of claim 1 wherein said means for exciting resonance of the second group of bodies at the second frequency includes a variable frequency audio field modulator for modulating the intensity of the polarizing field at an audio frequency which combines with a radio frequency carrier excitation applied to the sample to produce a sideband radio frequency resonance excitation in the sample at a second radio frequency, and wherein said means for scanning the frequency of the resonance excitation of the second group includes means for scanning the audio frequency of said audio field modulator.

References Cited

UNITED STATES PATENTS 3,215,930  11/1965  Turner _____ 324—0.5

OTHER REFERENCES

Freeman et al.: The Effect of a Second Radiofrequency on High Resolution Proton Magnetic Resonance Spectra, Proc. of Phys. Soc. of London, pp. 794–807, April 1962.

Baker et al.: Two Synthesizer Spin Decoupling: INDOR Spectroscopy, Rev. of Sci. Instr., 34(3), pp. 238–246, March 1963.

ARCHIE R. BORCHELT, Primary Examiner

MICHAEL J. LYNCH, Assistant Examiner